US012520077B2

(12) United States Patent
Fee et al.

(10) Patent No.: US 12,520,077 B2
(45) Date of Patent: Jan. 6, 2026

(54) DIRECTIONAL AUDIO MICROPHONES IN A SURVEILLANCE SYSTEM

(71) Applicant: Tyco Fire & Security GmbH, Neuhausen am Rheinfall (CH)

(72) Inventors: Paul Fee, Belfast (GB); David Monahan, Donaghadee (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 249 days.

(21) Appl. No.: 18/186,579

(22) Filed: Mar. 20, 2023

(65) Prior Publication Data

US 2024/0323598 A1 Sep. 26, 2024

(51) Int. Cl.
| | |
|---|---|
| *H04R 1/40* | (2006.01) |
| *H04N 7/18* | (2006.01) |
| *H04R 3/00* | (2006.01) |
| *H04S 7/00* | (2006.01) |

(52) U.S. Cl.
CPC .............. *H04R 1/406* (2013.01); *H04N 7/18* (2013.01); *H04R 3/005* (2013.01); *H04S 7/30* (2013.01); *H04R 2201/401* (2013.01); *H04R 2430/21* (2013.01); *H04S 2400/15* (2013.01)

(58) Field of Classification Search
CPC .. H04R 1/406; H04R 3/005; H04R 2201/401; H04R 2430/21; H04N 7/18; H04S 7/30; H04S 2400/15
See application file for complete search history.

(56) References Cited

U.S. PATENT DOCUMENTS

| | | | |
|---|---|---|---|
| 9,992,449 B1* | 6/2018 | Ashkenazi | H04N 5/2628 |
| 10,873,727 B2* | 12/2020 | Mughal | G10L 21/0232 |
| 2009/0295923 A1* | 12/2009 | Moore | G08B 13/19695 |
| | | | 348/E5.022 |
| 2016/0277863 A1* | 9/2016 | Cahill | G01S 3/8083 |
| 2017/0331899 A1* | 11/2017 | Binder | G07C 3/02 |
| 2019/0349551 A1* | 11/2019 | Mughal | H04R 1/406 |
| 2021/0382672 A1* | 12/2021 | Back | H04R 5/02 |
| 2021/0382678 A1* | 12/2021 | Back | H04M 3/568 |
| 2022/0262337 A1* | 8/2022 | Ziv | H04R 3/005 |
| 2024/0323598 A1* | 9/2024 | Fee | H04S 7/30 |

FOREIGN PATENT DOCUMENTS

WO WO-2006135962 A1 * 12/2006 ....... G08B 13/19623

\* cited by examiner

*Primary Examiner* — Akelaw Teshale
(74) *Attorney, Agent, or Firm* — ArentFox Schiff LLP (57) ABSTRACT

A system may be configured to implement directional audio capture via digital signal processing on audio captured by an array of microphones. In some aspects, the system may include a video capture device, a microphone array coupled to the video capture device, and a processing device. Further, the processing device may be configured to determine directional instruction information for the microphone array, the directional instruction information corresponding to a virtual capture direction for the microphone array, and generate a digital signal processing (DSP) plan based on the virtual capture direction. In addition, the processing device may be further configured to apply the processing plan to the plurality of audio captures captured by the microphone array to produce an audio output corresponding to the virtual capture direction.

20 Claims, 5 Drawing Sheets

FIG. 5

DIRECTIONAL AUDIO MICROPHONES IN A SURVEILLANCE SYSTEM

CROSS REFERENCE TO RELATED APPLICATIONS

This application is related to co-pending U.S. patent application Ser. No. 18/186,609, by Fee et al., entitled "Steering Audio Recordings in a Surveillance System," filed on Mar. 20, 2023, which is hereby incorporated by reference in its entirety.

FIELD OF TECHNOLOGY

The present disclosure relates generally to audio processing, and more particularly, to methods and systems for directional audio capture via a microphone array.

BACKGROUND

In some surveillance environments, a closed circuit television (CCTV) may include a camera attached to a microphone. Many CCTV systems include cameras that can move on request to allow an operator to adjust the field of view. However, each camera may be attached to a single microphone incapable of being steered. As a result, the operator is unable to synchronize audio capture with video capture. Further, once a CCTV system has recorded audio within the surveillance environment, an operator is unable to steer audio playback during video playback even though some surveillance systems provide adjustment to the field of view during video playback.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a system including: a video capture device; a microphone array including a plurality of audio capture devices coupled with the video capture device, wherein the microphone array is configured to capture a plurality of audio captures and each audio capture of the plurality of audio captures is captured by an individual audio capture device of the plurality of audio capture devices; and a processing device including: a memory storing instructions thereon; and at least one processor coupled with the memory and configured by the instructions to: determine directional instruction information for the microphone array, the directional instruction information corresponding to a virtual capture direction for the microphone array; generate a digital signal processing (DSP) plan based on the virtual capture direction; and apply the processing plan to the plurality of audio captures to produce an audio output corresponding to the virtual capture direction.

In some aspects, the techniques described herein relate to a method including: determining directional instruction information for a microphone array including a plurality of audio capture devices coupled with a video capture device, the directional instruction information corresponding to a virtual capture direction for the microphone array; generating a digital signal processing (DSP) plan based on the virtual capture direction; and applying the processing plan to the plurality of audio captures to produce an audio reproduction corresponding to the virtual capture direction.

In some aspects, the techniques described herein relate to a non-transitory computer-readable device having instructions thereon that, when executed by at least one computing device, causes the at least one computing device to perform operations including: determining directional instruction information for a microphone array including a plurality of audio capture devices coupled with a video capture device, the directional instruction information corresponding to a virtual capture direction for the microphone array; generating a digital signal processing (DSP) plan based on the virtual capture direction; and applying the processing plan to the plurality of audio captures to produce an audio reproduction corresponding to the virtual capture direction.

In some aspects, the techniques described herein relate to a system including: a processing device including: a memory storing instructions thereon; and at least one processor coupled with the memory and configured by the instructions to: select audio information for audio playback, the audio information including a plurality of audio captures of a microphone array; determine directional instruction information for the audio playback, the directional instruction information identifying a virtual playback direction; generate a digital signal processing (DSP) plan based on the virtual playback direction; and apply the processing plan to the plurality of audio captures to produce the audio playback corresponding to the virtual playback direction.

In some aspects, the techniques described herein relate to a method including: selecting audio information for audio playback, the audio information including a plurality of audio captures of a microphone array; determining directional instruction information for the audio playback, the directional instruction information identifying a virtual playback direction; generating a digital signal processing (DSP) plan based on the virtual playback direction; and applying the processing plan to the plurality of audio captures to produce the audio playback corresponding to the virtual playback direction.

In some aspects, the techniques described herein relate to a non-transitory computer-readable device having instructions thereon that, when executed by at least one computing device, causes the at least one computing device to perform operations including: selecting audio information for audio playback, the audio information including a plurality of audio captures of a microphone array; determining directional instruction information for the audio playback, the directional instruction information identifying a virtual playback direction; generating a digital signal processing (DSP) plan based on the virtual playback direction; and applying the processing plan to the plurality of audio captures to produce the audio playback corresponding to the virtual playback direction.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide directional audio processing and/or playback. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some implementations, one or more problems solved by the present solution is limited audio steering during real-time audio reproduction and/or audio playback. For example, this present disclosure describes systems and methods for implementing directional audio capture via digital signal processing on audio captured by an array of microphones. Additionally, or alternatively, this present disclosure further describes systems and methods for implementing directional audio playback via digital signal processing on recorded audio. The present solution provides improved audio-video synchronization, steerable audio in systems without directional microphones, and avoids information loss occurring during audio recording.

Figure 1:
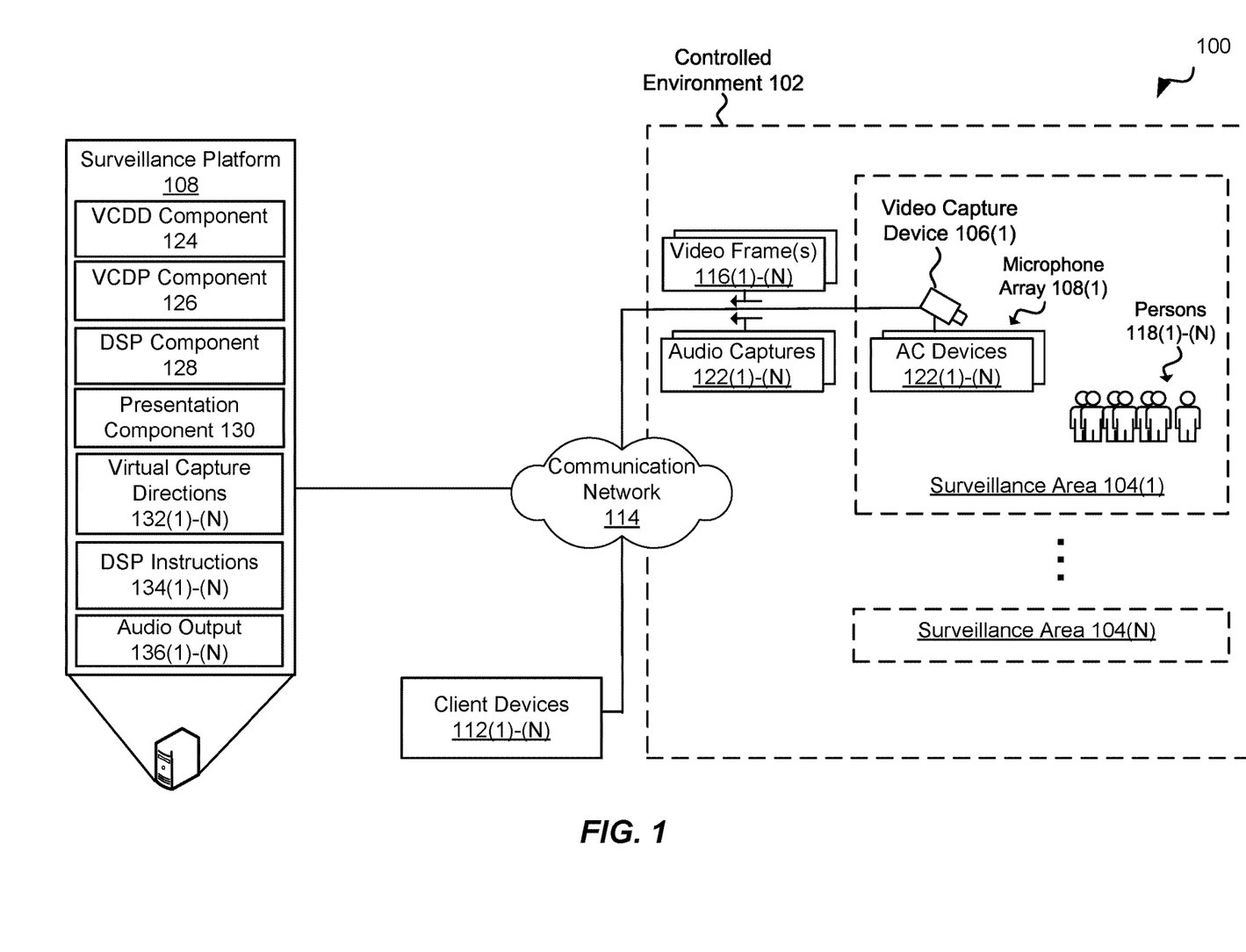
FIG. 1 is a block diagram of an example of a system for implementing directional audio capture in a surveillance environment, according to some implementations.

Referring to FIG. 1, in one non-limiting aspect, a system 100 may be configured to implement directional audio capture in a surveillance environment 102. As described herein, in some aspects, a "virtual capture direction" may refer to a DSP effect applied to one or more audio captures to produce audio output as if the audio capture devices that captured the one or more audio captures were a single microphone adjusted in a specified direction.

As illustrated in FIG. 1, the surveillance environment 102 may include one or more surveillance areas 104(1)-(N). Further, in some aspects, the system 100 may include one or more video capture devices 106(1)-(N), one or more microphone arrays 108(1)-(N), a surveillance platform 110, one or more client devices 112(1)-(N), and a communication network 114. Further, the video capture devices 106(1)-(N), the microphone arrays 108(1)-(N), the surveillance platform 110, and/or the client devices 112(1)-(N) may communicate via the communication network 114. In some implementations, the communication network 114 may include one or more of a wired and/or wireless private network, personal area network, local area network, wide area network, telecommunications network, or the Internet.

In some aspects, each video capture devices 106(1)-(N) may be configured to capture video frames 116(1)-(N) of activity within the surveillance areas 104(1)-(N). For instance, the video capture device 106(1) may capture activity of the persons 118(1)-(N) in the video frames 116(1)-(N), and send the video frames 116(1)-(N) to the surveillance platform 110 via the communication network 114. In some examples, the surveillance environment 102 may be a retail environment and the persons 118(1)-(N) may be patrons entering into, traversing through, and/or exiting from the surveillance environment 102. Although FIG. 1 illustrates one video capture device 106(1) within the surveillance area 104(1), in some other implementations each surveillance area 104(1) may include any number of video capture devices 106. Some examples of a video capture device 106 include a closed circuit television (CCTV) camera, a pan-tilt-zoom (PTZ) camera, ultra-wide angle lens camera, fisheye lens camera, etc.

In some aspects, a microphone array 108 may be coupled with a video capture device 106. For example, the microphone array 108(1) may be coupled with the video capture device 106(1), the microphone array 108(n) may be coupled with the video capture device 106(n), and so forth. As illustrated in FIG. 1, each microphone array 108 may include a plurality of audio capture devices 120 (e.g., microphones). In some aspects, the audio capture devices 120 may be positioned in different directions. Further, each audio capture device 120 may be configured to periodically record an audio capture 122 within the surveillance areas 104(1)-(N), and transmit the audio capture 122 to the surveillance platform 110. In some aspects, a microphone array 108 may transmit the plurality of audio captures 122 captured by the corresponding plurality of audio capture devices 120 to the surveillance platform 110. For example, the microphone array 108 may transmit a plurality of audio captures 122 to the surveillance platform 110 via the video capture device 106 coupled with the microphone array 108.

In some aspects, the surveillance platform 110 may be configured to monitor the persons 118(1)-(N) within the surveillance environment 102 via the video capture devices 106(1)-(n) and the microphones arrays 108(1)-(n). For example, the surveillance platform 110 may be configured to receive the video frames 116(1)-(N) from the video capture devices 106 and/or the audio captures 122 from the microphone arrays 108, synchronize the video frames 116(1)-(N) and/or the audio captures 122 as audio-visual information, and reproduce the audio-visual information for consumption by monitoring personnel via at least one of a display device, a speaker device, and/or a client device 112. In some aspects, a video capture device 106 and one or more corresponding microphone arrays 108 may stream video frames 116 and audio captures 122 to the surveillance platform 110 for consumption by monitoring personnel. As illustrated in FIG. 1, the surveillance platform 110 may include a virtual capture direction determination component 124, a virtual capture direction planning component 126, a digital signal processing (DSP) component 128, and a presentation component 130.

In some aspects, the virtual capture direction determination component 124 may determine a virtual capture direction 132 to apply to the plurality of audio captures 122 captured by a particular microphone array 108. As a result, monitoring personnel may employ the microphone array to listen to different regions of interest. In some aspects, the virtual capture direction determination component 124 may receive user input specifying selection of a virtual capture direction 132. For example, a user may employ a user input device (e.g., a keyboard, a mouse, a touchscreen device) to specify a virtual capture direction 132 for audio capture via the microphone array 108. In some other aspects, the virtual capture direction determination component 124 may determine a virtual capture direction 132 based upon a triggering event. For example, the virtual capture direction determination component 124 may detect motion, particular type of activity, and/or a face within one or more video frames 116, determine a location corresponding to the detected motion, activity, and/or face, and generate a virtual capture direction 132 corresponding to a microphone pointed at the location. In some aspects, the virtual capture direction determination component 124 may employ machine learning (ML) and/or pattern recognition techniques to detect occurrence a triggering event. For example, in some aspects, the virtual capture direction determination component 124 may employ one or more ML models to identify a location corresponding to a particular activity within one or more video frames 116.

In some aspects, the virtual capture direction planning component 126 may determine one or more DSP instructions 134 to apply to the audio captures 122 of a microphone array 108 to produce audio output from a microphone array 108 having a particular virtual capture direction 132. For example, the virtual capture direction planning component 126 may determine whether to apply signal filtering, signal amplification, and/or other signal conditioning techniques, the specific signal conditioning technique to apply to each audio capture 122 captured by a microphone array, and attributes (e.g., degree, timing, etc.) of application of the conditioning technique to each audio capture 122 captured by a microphone array 108. In some aspects, the virtual capture direction planning component 126 may employ machine learning (ML) and/or pattern recognition techniques to determine the one or more DSP instructions 134. In some aspects, the DSP component 128 may apply the one or more DSP instructions 134 to the plurality of audio captures 122 of a microphone array 108 to produce an audio output 136 corresponding to a virtual capture direction 132. For example, the DSP component 128 may apply one or more signal conditioning techniques specified in the one or more DSP instructions 134 to the plurality of audio captures 122 produce the audio output 136 from the microphone array 108 having the virtual capture direction 132.

Further, the presentation component 130 may be configured to display the video frames 116 within a graphical user interface (GUI) and reproduce the audio output 136. For example, the presentation component 130 may be configured to cause display of the activity within the surveillance environment 102 within a GUI on a display of the surveillance platform 110 and/or a display of a client device 112. As another example, the presentation component 130 may be configured to cause reproduction of the audio output 136 via a speaker of the surveillance platform 110 and/or a speaker of a client device 112.

Figure 2:
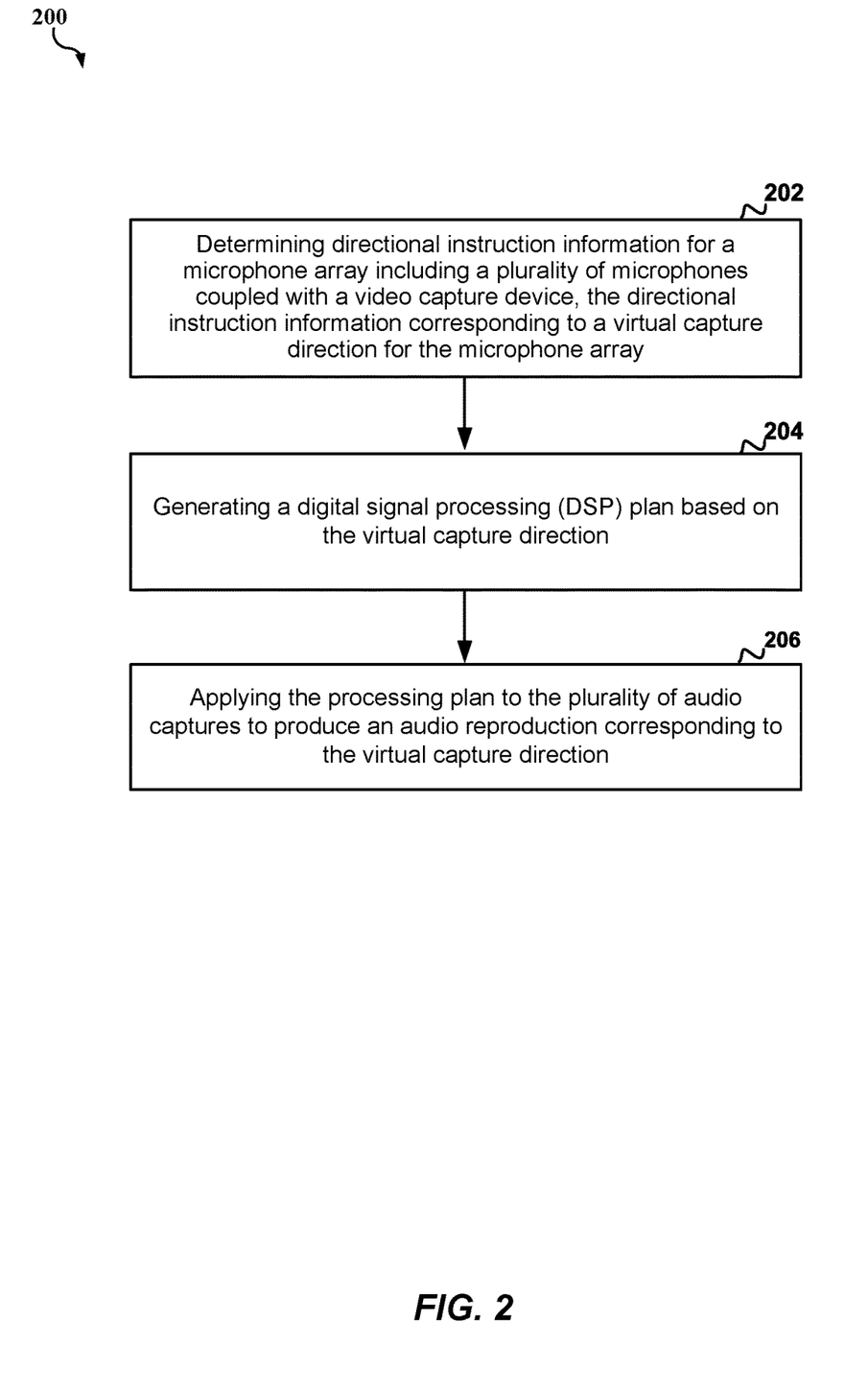
FIG. 2 is a flow diagram of an example method of directional audio capture, according to some implementations.

Referring to FIG. 2, in operation, the surveillance platform 110 or computing device 500 may perform an example method 200 for employing a directional microphone in a surveillance system. The method 200 may be performed by one or more components of the surveillance platform 110, the computing device 500, or any device/component described herein according to the techniques described with reference to FIGS. 1, 3, and 5.

At block 202, the method 200 includes determining directional instruction information for a microphone array including a plurality of audio capture devices coupled with a video capture device, the directional instruction information corresponding to a virtual capture direction for the microphone array. For example, the surveillance platform 110 may receive user input indicating selection of a virtual capture direction 132 for a microphone array 108(1). As another example, the surveillance platform 110 may detect a triggering event, determine the location of a triggering event, and identify a virtual capture direction 132 corresponding to the location. Accordingly, the surveillance platform 110 or the processor 502 executing the virtual capture direction determination component 124 may provide means for determining directional instruction information for a microphone array including a plurality of audio capture devices coupled with a video capture device, the directional instruction information corresponding to a virtual capture direction for the microphone array.

At block 204, the method 200 includes generating a digital signal processing (DSP) plan based on the virtual capture direction. For example, the surveillance platform 110 may determine a DSP plan including one or more one or more DSP instructions 134 to implement the virtual capture direction 132. Accordingly, the surveillance platform 110 or the processor 502 executing the virtual capture direction planning component 126 may provide means for generating a digital signal processing (DSP) plan based on the virtual capture direction.

At block 206, the method 200 includes applying the processing plan to the plurality of audio captures to produce an audio reproduction corresponding to the virtual capture direction. For instance, the surveillance platform 110 may apply the one or more DSP instructions 134 of the DSP plan to the audio captures 122 of the microphone array 108 to produce the audio output 136 corresponding to the virtual capture direction 132. Accordingly, the surveillance platform 110 or the processor 502 executing the DSP component 128 may provide means for applying the processing plan to the plurality of audio captures to produce an audio reproduction corresponding to the virtual capture direction.

In an alternative or additional aspect, the method 200 comprises wherein applying the processing plan to the plurality of audio captures to produce the audio output apply a filter to one or more audio captures of the plurality of audio captures.

In an alternative or additional aspect, the method 200 comprises detecting a triggering event based upon the plurality of audio captures; and determining the virtual capture direction based on a predicted location of the triggering event.

In an alternative or additional aspect, the method 200 comprises wherein the triggering event includes at least one of motion detection or face detection.

In an alternative or additional aspect, the method 200 further comprises wherein to determining the directional instruction information for the microphone array includes receiving, via user input, the directional instruction information for the microphone array.

In an alternative or additional aspect, the method 200 further comprises wherein the user input adjusts a field of view of the video capture device.

In an alternative or additional aspect, the method 200 further comprises wherein the video capture device is a closed circuit television camera system.

In an alternative or additional aspect, the method 200 further comprises wherein the video capture device is a pan-tilt-zoom camera device.

Figure 3:
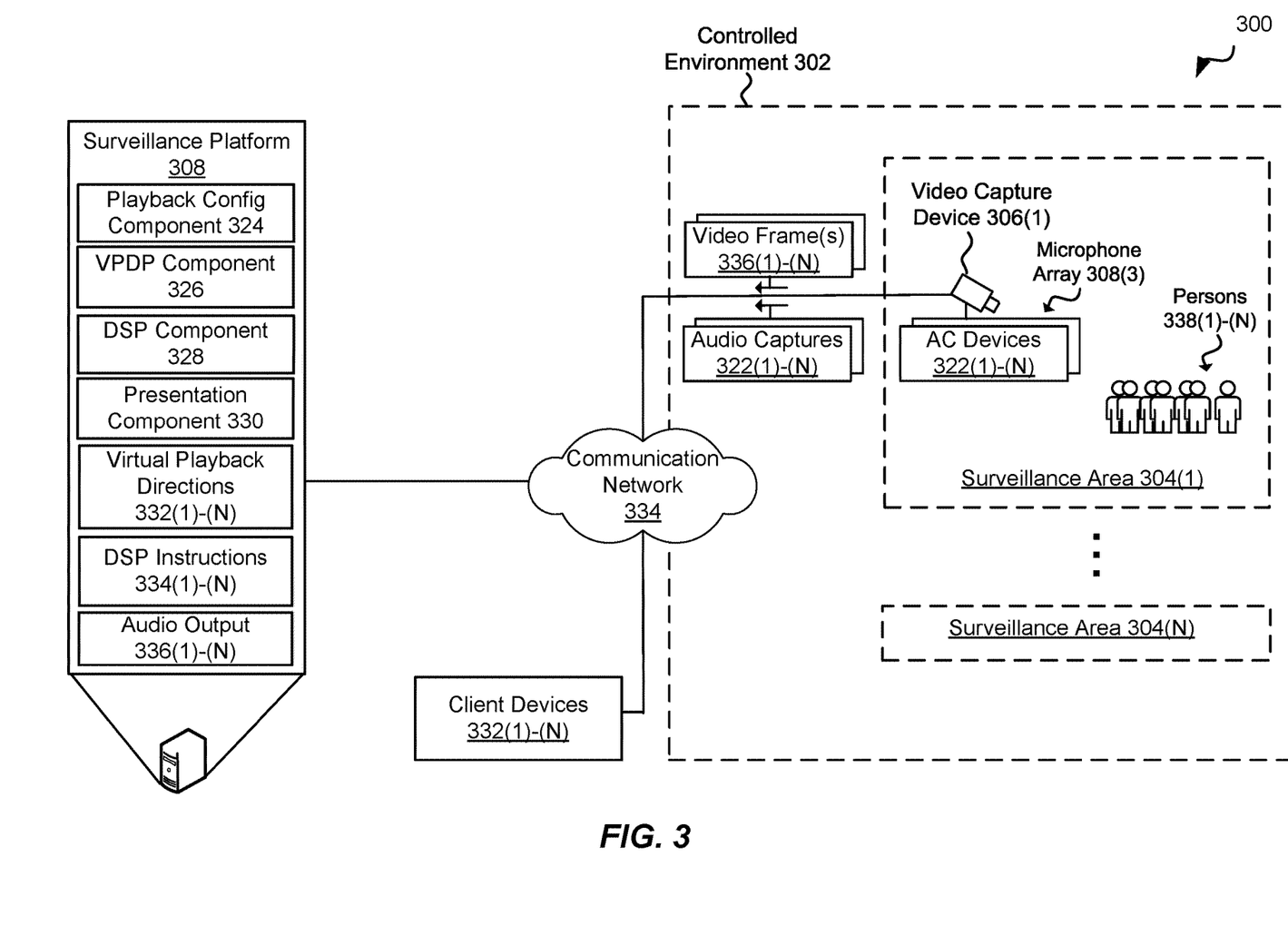
FIG. 3 is a block diagram of an example of a system for implementing directional audio playback in a surveillance environment, according to some implementations.

Referring to FIG. 3, in one non-limiting aspect, a system 300 may be configured to implement directional audio playback in a surveillance environment 302. As described herein, in some aspects, a "virtual playback direction" may refer to a DSP effect applied to one or more recorded audio captures during playback to produce audio output as if the audio capture devices that captured the one or more audio captures were single microphone adjusted in a specified direction.

As illustrated in FIG. 3, the surveillance environment 302 may include one or more surveillance areas 304(1)-(N). Further, in some aspects, the system 300 may include one or more video capture devices 306(1)-(N), one or more microphone arrays 308(1)-(N), a surveillance platform 310, one or more client devices 312(1)-(N), and a communication network 314. Further, the video capture devices 306(1)-(N), the microphone arrays 308(1)-(N), the surveillance platform 310, and/or the client devices 312(1)-(N) may communicate via the communication network 314. In some implementations, the communication network 314 may include one or more of a wired and/or wireless private network, personal area network, local area network, wide area network, telecommunications network, or the Internet.

In some aspects, each video capture devices 306(1)-(N) may be configured to capture video frames 316(1)-(N) of activity within the surveillance areas 304(1)-(N). For instance, the video capture device 306(1) may capture activity of the persons 318(1)-(N) in the video frames 316(1)-(N), and send the video frames 316(1)-(N) to the surveillance platform 110 via the communication network 314. In some examples, the surveillance environment 102 may be a retail environment and the persons 318(1)-(N) may be patrons entering into, traversing through, and/or exiting from the surveillance environment 102. Although FIG. 1 illustrates one video capture device 306(1) within the surveillance area 304(1), in some other implementations each surveillance area 304(1) may include any number of video capture devices 106. Some examples of a video capture device 106 include a closed circuit television (CCTV) camera, a pan-tilt-zoom (PTZ) camera, ultra-wide angle lens camera, fisheye lens camera, etc.

In some aspects, a microphone array 308 may be coupled with a video capture device 306. For example, the microphone array 308(1) may be coupled with the video capture device 306(1), the microphone array 308(n) may be coupled with the video capture device 306(n), and so forth. As illustrated in FIG. 3, each microphone array 308 may include a plurality of audio capture devices 320 (e.g., microphones). In some aspects, the audio capture devices 120 may be positioned in different directions. Further, each audio capture device 320 may be configured to periodically record an audio capture 322 within the surveillance areas 304(1)-(N), and transmit the audio capture 322 to the surveillance platform 310. In some aspects, a microphone array 308 may transmit the plurality of audio captures 322 captured by the corresponding plurality of audio capture devices 320 to the surveillance platform 310. For example, the microphone array 308 may transmit a plurality of audio captures 322 to the surveillance platform 310 via the video capture device 306 coupled with the microphone array 308.

In some aspects, the surveillance platform 310 may be configured to monitor the persons 318(1)-(N) within the surveillance environment 302 via the video capture devices 306(1)-(n) and the microphones arrays 308(1)-(n). For example, the surveillance platform 310 may be configured to receive the video frames 316(1)-(N) from the video capture devices 306 and/or the audio captures 322 from the microphone arrays 308, synchronize the video frames 316(1)-(N) and/or the audio captures 322 as audio-visual information, and reproduce the audio-visual information for consumption by monitoring personnel via at least one of a display device, a speaker device, and/or a client device 312. In some aspects, a video capture device 306 and one or more corresponding microphone arrays 308 may stream video frames 316 and audio captures 322 to the surveillance platform 310 for consumption by monitoring personnel. As illustrated in FIG. 3, the surveillance platform 310 may include a playback configuration component 324, a virtual playback direction planning component 326, a digital signal processing (DSP) component 328, and a presentation component 330.

In some aspects, the playback configuration component 324 may configure playback of a plurality of audio captures 322 selected by a user. For example, the playback configuration component 324 may determine a virtual playback direction 332 to apply during playback of one or more audio captures 322. In some aspects, the virtual capture direction determination component 124 may receive user input indicating a virtual playback direction 332. For example, a user may employ a user input device to specify a virtual playback direction 132 for video playback of one or more video frames 316(1)-(N) and audio playback of one or more audio captures 322(1)-(N) corresponding to the one or more video frames 316(1)-(N). As a result, monitoring personnel may adjust (e.g., pan) a view of the video frames 316 during playback of the audio captures 322 according to a directionality corresponding to the adjusting of the view of video playback. In some other aspects, a user may provide first input specifying a playback direction for video playback of one or more frames and second input specifying a playback direction for the audio captures 322. As a result, monitoring personnel may adjust a view of the video frames 316 during playback of the audio captures 322 according to a directionality different from the adjusting of the view of video playback. Moreover, monitoring personnel are not limited to playing back audio with a single steering direction applied during capture but can adjust the steering direction during playback.

In some other aspects, the playback configuration component 324 may determine a virtual playback direction 332 based upon a triggering event. For example, the virtual capture direction determination component 124 may detect motion, a particular type of activity (e.g., authenticating to an access panel), and/or a face within one or more video frames 116, determine a location corresponding to the detected motion, activity, and/or face, and generate a virtual playback direction 332 corresponding to a microphone pointed at the location. In yet still some other aspects, the playback configuration component 324 may detect a triggering event within the audio captures 322. For example, the playback configuration component 324 may detect screaming within the audio captures 322 and dynamically determine a virtual playback direction 332 that will playback the screaming within the audio captures 322. In some aspects, the playback configuration component 324 may employ machine learning (ML) and/or pattern recognition techniques to detect occurrence a triggering event. For example, in some aspects the playback configuration component 324 may employ one or more ML models to identify a location corresponding to a particular activity within one or more video frames 316.

In some aspects, the virtual capture direction planning component 326 may determine one or more DSP instructions 334 to apply to the audio captures 322 of a microphone array 308 to produce audio output from a microphone array having a particular virtual playback direction 332. For example, the virtual capture direction planning component 326 may determine whether to apply signal filtering, signal amplification, and/or other signal conditioning techniques, the specific signal conditioning technique to apply to each audio capture 322 captured by a microphone array, and attributes (e.g., degree, timing, etc.) of application of the conditioning technique to each audio capture 322 captured by a microphone array 308. In some aspects, the virtual capture direction planning component 326 may employ machine learning (ML) and/or pattern recognition techniques to determine the one or more DSP instructions 334. In some aspects, the DSP component 328 may apply the one or more DSP instructions 334 to the plurality of audio captures 322 of a microphone array 308 to produce an audio output 336 corresponding to a virtual playback direction 332. For example, the DSP component 328 may apply one or more signal conditioning techniques specified in the one or more DSP instructions 334 to the plurality of audio captures 322 produce the audio output 336 from the microphone array 308 having virtual playback direction 332.

Further, the presentation component 330 may be configured to display the video frames 316 within a graphical user interface (GUI) and reproduce the audio output 336. For example, the presentation component 330 may be configured to cause display of the activity within the surveillance environment 302 within a GUI on a display of the surveillance platform 310 and/or a display of a client device 312. As another example, the presentation component 330 may be configured to cause reproduction of the audio output 336 via a speaker of the surveillance platform 310 and/or a speaker of a client device 312.

Figure 4:
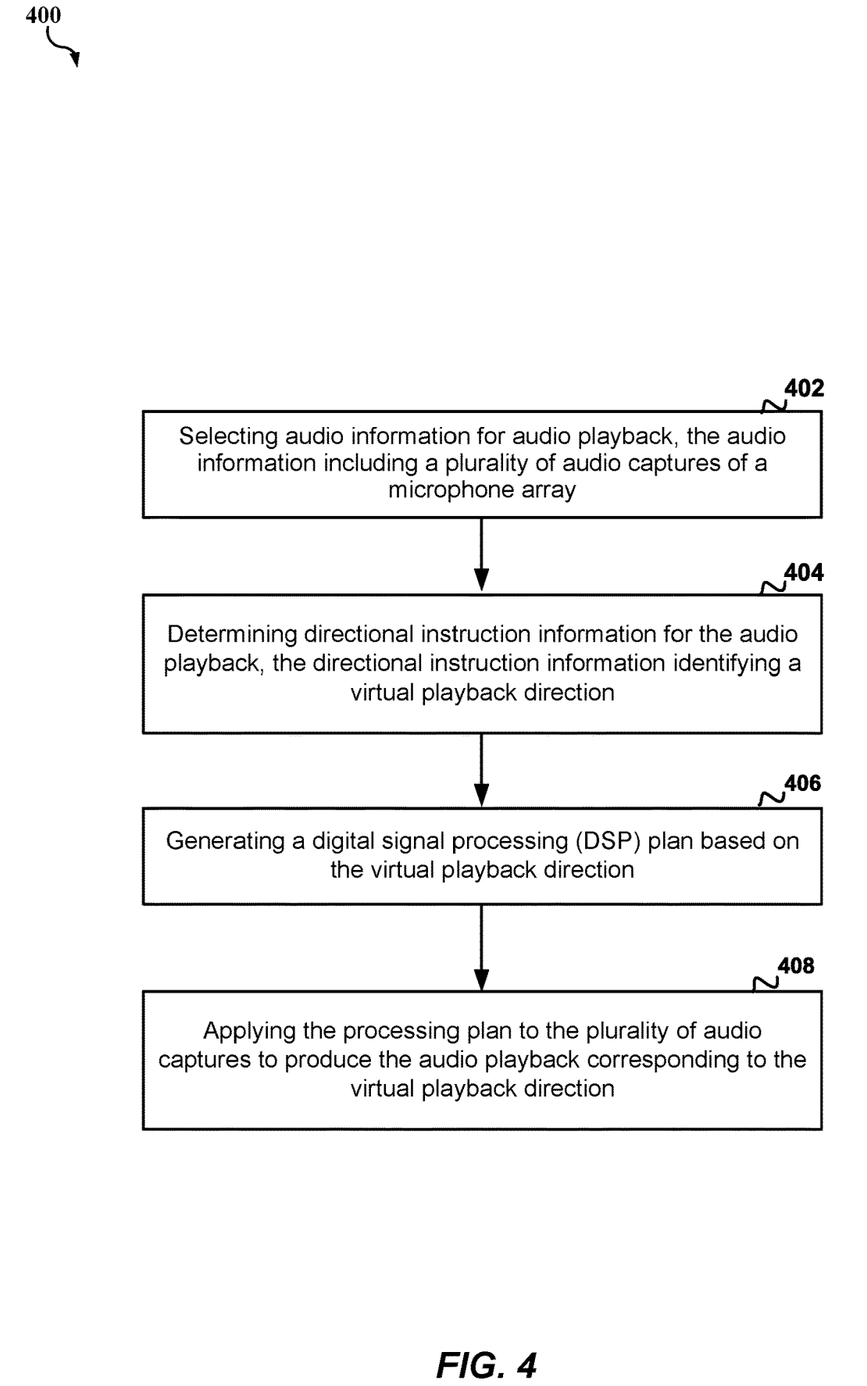
FIG. 4 is a flow diagram of a second example method of directional audio playback, according to some implementations.

Referring to FIG. 4, in operation, the surveillance platform 310 or computing device 500 may perform an example method 400 for employing a directional mic in a surveillance system. The method 400 may be performed by one or more components of the surveillance platform 310, the computing device 500, or any device/component described herein according to the techniques described with reference to FIGS. 1, 3, and 5.

At block 402, the method 400 includes selecting audio information for audio playback, the audio information including a plurality of audio captures of a microphone array. For example, the surveillance platform 310 may select previously-recorded audio captures 322 to playback with a user interface. Accordingly, the surveillance platform 310 or the processor 502 executing the playback configuration component 324 may provide means for selecting audio information for audio playback, the audio information including a plurality of audio captures of a microphone array.

At block 404, the method 400 includes determining directional instruction information for the audio playback, the directional instruction information identifying a virtual playback direction. For example, the surveillance platform 310 may receive user input indicating selection of a virtual playback direction 332 for the selected plurality of captures 332. As another example, the surveillance platform 310 may detect a triggering event, determine the location of a triggering event, and identify a virtual playback direction 332 corresponding to the location. Accordingly, the surveillance platform 310 or the processor 502 executing the playback configuration component 324 may provide means for determining directional instruction information for the audio playback, the directional instruction information corresponding to a virtual capture direction for the microphone array.

At block 406, the method 400 includes generating a digital signal processing (DSP) plan based on the virtual playback direction. For example, the surveillance platform 310 may determine a DSP plan including one or more one or more DSP instructions 134 to implement the virtual playback direction 332. Accordingly, the surveillance platform 310 or the processor 502 executing the virtual playback direction planning component 326 may provide means for generating a digital signal processing (DSP) plan based on the virtual capture direction.

At block 408, the method 400 includes applying the processing plan to the plurality of audio captures to produce the audio playback corresponding to the virtual playback direction. For instance, the surveillance platform 310 may apply the one or more DSP instructions 334 of the DSP plan to the audio captures 322 to produce the audio output 336 corresponding to the virtual playback direction 332. Accordingly, the surveillance platform 310 or the processor 502 executing the DSP component 328 may provide means for applying the processing plan to the plurality of audio captures to produce the audio playback corresponding to the virtual capture direction.

In an alternative or additional aspect, the method 400 comprises wherein applying the processing plan to the plurality of audio captures to produce the audio playback includes applying a filter to one or more audio captures of the plurality of audio captures.

In an alternative or additional aspect, the method 400 comprises wherein determining the directional instruction information for the audio playback includes receiving, via user input, the directional instruction information indicating pan movement during video playback associated with the audio playback.

In an alternative or additional aspect, the method 400 comprises wherein determining the directional instruction information for the audio playback includes receiving, via first user input, the directional instruction information that is different from second user input indicating pan movement during video playback associated with the audio playback.

In an alternative or additional aspect, the method 400 comprises wherein determining the directional instruction information for the audio playback, includes: tracking a location of an object within one or more video frames; and determining the directional instruction information for the audio playback based on the location of the object.

In an alternative or additional aspect, the method 400 further comprises receiving a selection of the object.

Figure 5:
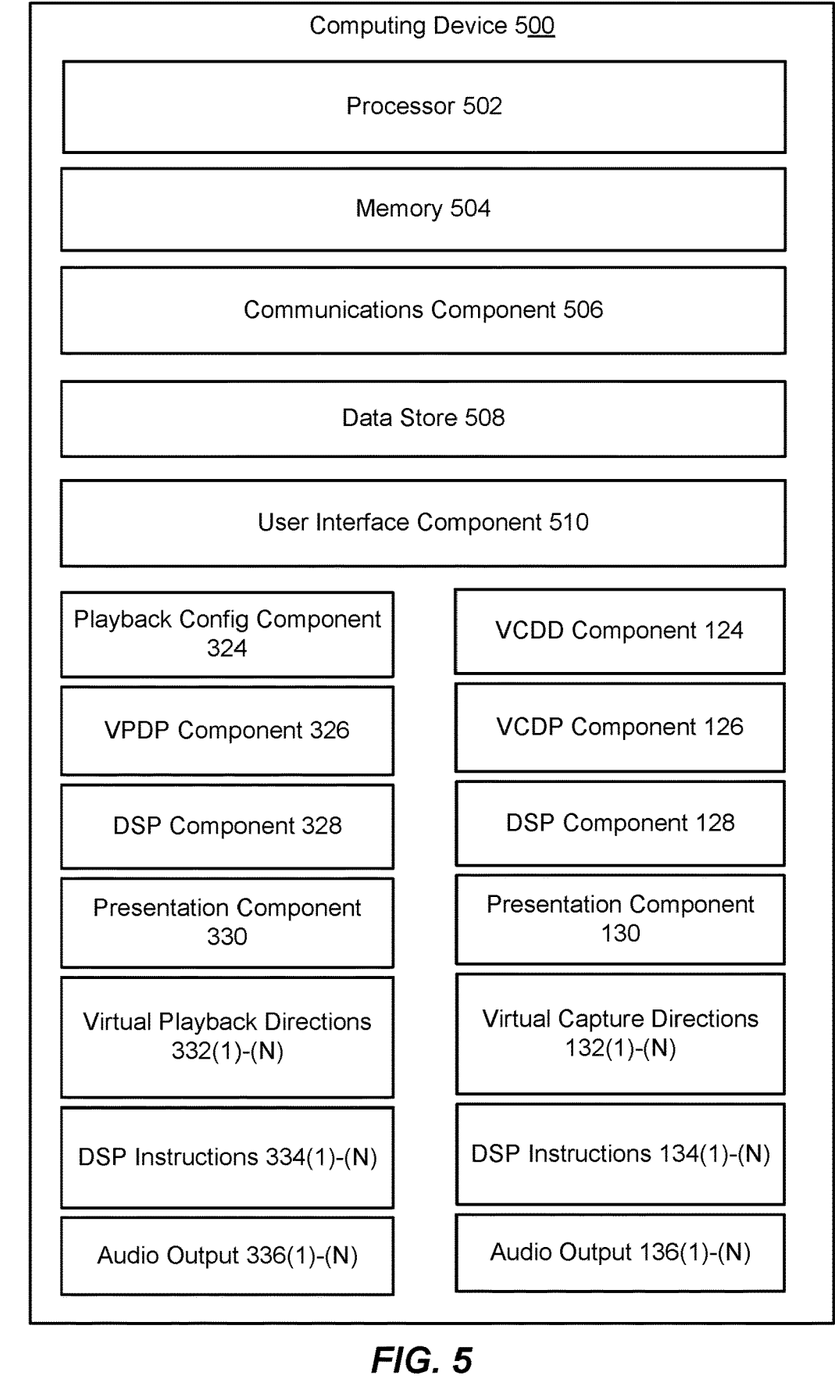
FIG. 5 is block diagram of an example of a computer device configured to implement object counting in high volume traffic, according to some implementations.

Referring to FIG. 5, a computing device 500 may implement all or a portion of the functionality described herein. The computing device 500 may be or may include or may be configured to implement the functionality of at least a portion of the system 100, or any component therein. For example, the computing device 500 may be or may include or may be configured to implement the functionality of the plurality of the video capture devices 106 and/or the surveillance platform 110. The computing device 500 includes a processor 502 which may be configured to execute or implement software, hardware, and/or firmware modules that perform any functionality described herein. For example, the processor 502 may be configured to execute or implement software, hardware, and/or firmware modules that perform any functionality described herein with reference to the virtual capture direction determination component 124, the virtual capture direction planning component 126, the DSP component 128, the presentation component 130, the playback configuration component 324, the virtual playback direction planning component 326, the digital signal processing (DSP) component 328, and the presentation component 330, or any other component/system/device described herein.

The processor 502 may be a micro-controller, an application-specific integrated circuit (ASIC), a digital signal processor (DSP), or a field-programmable gate array (FPGA), and/or may include a single or multiple set of processors or multi-core processors. Moreover, the processor 502 may be implemented as an integrated processing system and/or a distributed processing system. The computing device 500 may further include a memory 504, such as for storing local versions of applications being executed by the processor 502, related instructions, parameters, etc. The memory 504 may include a type of memory usable by a computer, such as random access memory (RAM), read only memory (ROM), tapes, magnetic discs, optical discs, volatile memory, non-volatile memory, and any combination thereof. Additionally, the processor 502 and the memory 504 may include and execute an operating system executing on the processor 502, one or more applications, display drivers, and/or other components of the computing device 500.

Further, the computing device 500 may include a communications component 506 that provides for establishing and maintaining communications with one or more other devices, parties, entities, etc. utilizing hardware, software, and services. The communications component 506 may carry communications between components on the computing device 500, as well as between the computing device 500 and external devices, such as devices located across a communications network and/or devices serially or locally connected to the computing device 500. In an aspect, for example, the communications component 506 may include one or more buses, and may further include transmit chain components and receive chain components associated with a wireless or wired transmitter and receiver, respectively, operable for interfacing with external devices.

Additionally, the computing device 500 may include a data store 508, which can be any suitable combination of hardware and/or software, that provides for mass storage of information, databases, and programs. For example, the data store 508 may be or may include a data repository for applications and/or related parameters not currently being executed by processor 502. In addition, the data store 508 may be a data repository for an operating system, application, display driver, etc., executing on the processor 502, and/or one or more other components of the computing device 500.

The computing device 500 may also include a user interface component 510 operable to receive inputs from a user of the computing device 500 and further operable to generate outputs for presentation to the user (e.g., via a display interface to a display device). The user interface component 510 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 510 may include one or more output devices, including but not limited to a display interface, a speaker, a haptic feedback mechanism, a printer, any other mechanism capable of presenting an output to a user, or any combination thereof.

What is claimed is:

1. A system comprising:
   a video capture device;
   a microphone array including a plurality of audio capture devices coupled with the video capture device, wherein the microphone array is configured to capture a plurality of audio captures for a triggering event and each audio capture of the plurality of audio captures is captured by an individual audio capture device of the plurality of audio capture devices; and
   processing device comprising:
   a memory storing instructions thereon; and
   at least one processor coupled with the memory and configured by the instructions to:
   determine directional instruction information for the microphone array, the directional instruction information corresponding to a virtual capture direction for audio capture of the plurality of audio captures for the triggering event via the microphone array;
   generate an audio digital signal processing (DSP) plan based on the virtual capture direction; and
   apply the audio DSP plan to the plurality of audio captures for the triggering event to produce an audio output corresponding to the virtual capture direction.

2. The system of claim 1, wherein to apply the audio DSP plan to the plurality of audio captures to produce the audio output, the at least one processor is configured to apply a filter to one or more audio captures of the plurality of audio captures.

3. The system of claim 1, wherein the at least one processor is configured to:
   detect the triggering event based upon at least the plurality of audio captures for the triggering event; and
   determine the virtual capture direction based on a predicted location of the triggering event.

4. The system of claim 3, wherein the triggering event includes at least one of motion detection or face detection.

5. The system of claim 1, wherein to determine the directional instruction information for the microphone array, the at least one processor is configured to receive, via user input, the directional instruction information for the microphone array.

6. The system of claim 5, wherein the user input adjusts a field of view of the video capture device.

7. The system of claim 1, wherein the video capture device is a closed circuit television camera system.

8. The system of claim 1, wherein the video capture device is a pan-tilt-zoom camera device.

9. A method comprising:
   determining directional instruction information for a microphone array including a plurality of audio capture devices coupled with a video capture device, the directional instruction information corresponding to a virtual capture direction for audio capture of a plurality of audio captures for a triggering event via the microphone array;
   generating an audio digital signal processing (DSP) plan based on the virtual capture direction; and
   applying the audio DSP plan to the plurality of audio captures for the triggering event to produce an audio reproduction corresponding to the virtual capture direction.

10. The method of claim 9, wherein applying the audio DSP plan to the plurality of audio captures to produce the audio reproduction comprises applying a filter to one or more audio captures of the plurality of audio captures.

11. The method of claim 9, further comprising:
    detecting the triggering event based upon at least the plurality of audio captures for the triggering event; and
    determining the virtual capture direction based on a predicted location of the triggering event.

12. The method of claim 11, wherein the triggering event includes at least one of motion detection or face detection.

13. The method of claim 9, wherein to determining the directional instruction information for the microphone array comprises receiving, via a user input, the directional instruction information for the microphone array.

14. The method of claim 13, wherein the user input adjusts a field of view of the video capture device.

15. The method of claim 9, wherein the video capture device is a closed circuit television camera system.

16. The method of claim 9, wherein the video capture device is a pan-tilt-zoom camera device.

17. A non-transitory computer-readable device having instructions thereon that, when executed by at least one computing device, causes the at least one computing device to perform operations comprising:
    determining directional instruction information for a microphone array including a plurality of audio capture devices coupled with a video capture device, the directional instruction information corresponding to a virtual capture direction audio capture of a plurality of audio captures for a triggering event via the microphone array;
    generating a digital signal processing (DSP) plan based on the virtual capture direction; and
    applying the audio DSP plan to the plurality of audio captures for the triggering event to produce an audio reproduction corresponding to the virtual capture direction.

18. The non-transitory computer-readable device of claim 17, wherein applying the audio DSP plan to the plurality of audio captures to produce the audio reproduction comprises applying a filter to one or more audio captures of the plurality of audio captures.

19. The non-transitory computer-readable device of claim 17, wherein the operations further comprise:
    detecting the triggering event based upon at least the plurality of audio captures for the triggering event; and
    determining the virtual capture direction based on a predicted location of the triggering event.

20. The non-transitory computer-readable device of claim 17, wherein determining the directional instruction information for the microphone array comprises receiving, via user input, the directional instruction information for the microphone array and/or the video capture device.

* * * * *